Patented Aug. 15, 1950

2,518,527

UNITED STATES PATENT OFFICE 2,518,527

MANUFACTURE OF STORAGE BATTERIES

Robert A. Daily, Muncie, Ind., assignor to General Motors Corporation, Detroit, Mich., a corporation of Delaware No Drawing. Application September 18, 1947, Serial No. 774,889

2 Claims. (Cl. 136—34)

This invention relates to the manufacture of storage batteries from pasted lead plates and its object is to make an improved battery at less cost. I have discovered that stabilization of the active material of the plates followed by relatively rapid formation thereof in a relatively weak forming electrolyte results in a substantial gain in battery performance and that formation efficiency is increased and formation time is decreased so that a better battery is produced at lower cost.

A stabilized condition is that condition of the active material which permits rapid formation by electric current of relatively high amperage. In the case of the negative active material, it is stabilized if conditioned so as to inhibit crystal growth. This can be done by the use of a suitable expander in the negative paste such as described in the patent to A. L. Hindall No. 2,436,299 granted February 17, 1948.

In the case of the positive active material, it is stabilized if so conditioned that, during the formation process in relatively weak electrolyte, the heat of chemical reaction is practically eliminated while providing for easy convertibility of the material to lead peroxide.

In unstabilized positive paste, there are substances which, if allowed to remain, would combine chemically with the forming electrolyte to form, with the generation of heat, compounds which are difficult to convert to lead peroxide. The positive paste is stabilized by converting said substances, prior to the formation step, to compounds which are inert to purely chemical combination with the forming electrolyte and which are easily convertible to lead peroxide.

One way of effecting stabilization of the positive material to a substantial degree is by curing the positive paste by the procedure disclosed in the application of A. L. Hindall, Serial No. 479,993, filed March 22, 1943. The highly reactive ingredients of the uncured paste, such as lead hydroxide and lead sulphate in colloidal form, are converted into basic lead sulphate of small crystal size which is easy to convert to lead peroxide in the forming electrolyte and does not react chemically with it.

According to Hindall application Serial No. 479,993, now Patent No. 2,481,218, curing of positive plates comprises reducing the moisture content of the paste, initially from about 11% to 13%, to about 9% by passing air at about 235° F. around the plates for 15 minutes, and then subjecting the plates for 30 minutes to non-circulating moisture charged air of approximately 100% relative humidity at a temperature of 200° F. to 220° F.

This treatment is followed by aging in order to obtain further stabilization. One of such aging process is claimed in copending application Serial No. 772,952. If the paste contained at least 16% red lead, the paste can be properly aged in air. When the proportion of red lead in the paste is 25%, aging in air can be effected in 72 hours. In order to obtain satisfactory results with less than 16% red lead in the paste, the following procedure is used: After the curing process, the plates are allowed to cool to room temperature in about 1½ hours. During this time the plates, which are cast in pairs, are separated and stacked on a perforated skid for the accelerated aging process. A skid supporting cooled plates is enclosed for one hour within a chamber into which steam enters at 300° F. at about 2″ water pressure. The chamber is provided by a metal box which is inverted over the skid of plates and fits into a water-seal groove located in the floor and around the skid. The steam enters the chamber through openings in the floor and passes into contact with the plates. If the steam pressure should exceed 2″ water pressure, some steam will escape through the water-seal. The temperature within the box is around 220° F., since the box is not thermally insulated. It is thought that during the accelerated aging step some of the free lead particles remaining in the paste are changed to relatively large crystals of litharge which are not highly reactive to the forming electrolyte.

To obtain still further stabilization of the positive material, accelerated aging is followed by aging in air for about 36 hours in order to minimize the existence of material which is highly reactive to the forming electrolyte.

The positive plates thus prepared and the negative plates which were prepared according to Hindall Patent No. 2,436,299, are assembled in groups with separators and the terminals are attached. The cell groups are formed and charged relatively rapidly, in a forming bath of relatively weak sulphuric acid in the range of 1.100–1.200 specific gravity for at least the larger part of the forming time, using electric current between 40 and 60 amperes for a time from 4 to 6 hours. For example, if the forming and charging current is 50 amperes, formation is complete in 5 hours. During formation and charging practically the only heating effect will be that due to the passing of electric current. Any appreciable amount of heating due to chemical change has been eliminated by virtue of stabilization of the positive active material. During formation the heat generated by electric current is dissipated from the electrolyte to the surrounding atmosphere. When necessary, cooling air is circulated around the vessel containing the electrolyte.

Example 1

The cell group is placed in a vessel and is covered with dilute sulphuric acid of 1.100 specific gravity. The current is maintained at the required amperage, 50 amperes for example, for 4 hours during which time the specific gravity of the electrolyte increases to about 1.140. Then this electrolyte is replaced by dilute sulphuric acid of specific gravity 1.290 to 1.310, and the formation is continued at 50 amperes for another hour. If the batteries are to be shipped dry, the cell groups are washed and dried or permanized and are then assembled in the battery cases and shipped dry. If the batteries are to be shipped wet, the cell groups are placed in the battery cases and covered with dilute sulphuric acid of 1.290 specific gravity.

Example 2

The battery cell groups are assembled in the battery cases before formation and are covered with dilute sulphuric acid of 1.100 specific gravity. Formation proceeds at 50 amperes, for example, for 4 hours. This electrolyte is replaced by dilute sulphuric acid of 1.380 specific gravity and formation is continued at 50 amperes for 1 hour. The specific gravity of this electrolyte falls to between 1.270 and 1.290 and the battery is ready to be shipped wet. This is known as the two-step fill.

Example 3

This is the one-step fill. The stabilized positive plates are pickled for 15 to 20 minutes in sulphuric acid of 1.550 specific gravity. This increases the amount of lead sulphate in the paste before formation starts so that the specific gravity of the forming electrolyte can increase to the required value at the end of formation. As stated in Daily Patent No. 2,287,868, the lead sulphate which is formed by pickling in strong acid is easy to convert to lead peroxide during the formation process. In Example 3, however, pickling is not for the purpose of converting colloidal substances highly reactive to forming electrolyte to substances less reactive, because curing and aging have practically eliminated such highly reactive colloidal substances. The pickled positive plates are assembled with negative plates, separators and terminal posts to form cell groups which are assembled in the battery cases and are covered with dilute sulphuric acid of 1.200 specific gravity. Rapid formation and charging is carried on using, for example, 50 amperage current for 5 hours. At the end of the formation period, the specific gravity of the electrolyte has risen to between 1.270 and 1.290 and the battery is ready for use.

The forming and charging current can be controlled manually or automatically. It is not necessary that the charging current be uniform so long as it does not vary too much and the average current for the formation time is suitable. Satisfactory results have been obtained by impressing different voltages at different times for example:

2.75 volts per cell group for ¼ hour.
2.35 volts per cell group for 2¾ hours.
2.55 volts per cell group for 1 hour.
2.65 volts per cell group for 1 hour.

The average current under these conditions is about 45 amperes. In connection with the foregoing examples, it is understood that the current of 40 to 60 amperes, as used in connection with standard automotive batteries which, according to the book on Storage Batteries by George Vinal, third edition, 1940 and published by John Wiley & Sons, on page 423, may be defined as follows: "The cells for starting and lighting batteries contain plates of the pasted variety, which are burned to the connecting straps to form the plate groups. Ordinarily there are not less than thirteen plates, including six positives and seven negatives, in any cell. The largest size of cells may contain as many as twenty-five plates. The dimensions of the plates vary, but the ordinary size are about 5⅝ inches in width, 5 inches in height, and $\frac{3}{32}$ inch or less in thickness." Using this data, it will be noted that a thirteen plate battery will have approximately 337.5 square inches of positive plate area while a seventeen plate battery will range about 480 square inches of positive plate area, whereby calculating on a 40 to 60 ampere input per cell, I use a current density per square inch of positive plate surface ranging from .119 to .178 ampere. This same current density will be applicable to 13, 15 and 17 plate standard batteries, etc.

The preferred apparatus for rapid forming and charging is disclosed in the application of Daily et al., Serial No. 791,510, filed December 13, 1947. This apparatus comprises a conveyor which travels along a negative bus bar and a series of positive bus bars each connected with the positive terminal of a separate D. C. source whose negative terminal is connected with the negative bus bar. The conveyor carries electrolyte containing trays in which the cell groups are submerged. The cell groups are connected in gangs and the end terminals are connected respectively with brushes engageable respectively with the negative bar and the positive bars in sequence. Each D. C. source is connected with its positive bar through a current regulator. When the cell group resistance changes materially while the gang is connected with certain positive bars, the associated current regulators operate automatically to maintain the required amperage. When the cell group resistance changes slightly while the gang is connected with certain other positive bars, the current regulators are set manually to obtain the required average current density. As disclosed in said application Ser. No. 791,510, the walls of the open vessel or tray compartment for containing each cell group of positive and negative plates and separators do not closely fit about the cell group as in the case of the walls of a storage battery cell. The tray compartment contains, in addition to the cell group, about 3½ times as much electrolyte as would be contained in the storage battery cell which receives the cell group. Because the forming electrolyte is relatively weak (1.100 specific gravity for ⅘ of the formation time in Examples 1 and 2 and 1.200 specific gravity for all of the formation time in Example 3) and, consequently, the development of a substantial number of heat units by the passage of electric current is required to raise the temperature of a unit volume of the electrolyte, and because there is a generous supply of electrolyte in each tray compartment, the heat absorption by the electrolyte and the heat dissipation therefrom to the surrounding atmosphere levels off to a value which is not objectionable, for example about 140° F. The apparatus disclosed in application Ser. No. 791,510 provides for removal of objectionable fumes by circulation of air but I have found that the circulating air is not necessary to limit the temperature of the bath to a value which is not objectionable. With a liberal quantity of electrolyte in each cell tray of said apparatus, the maximum forming bath temperature is about the same for summer and winter although the ambient room temperature may be 30° F. less in winter than in summer.

The rapid formation and charging of battery cell groups effects not only a saving in time (5 hours instead of 48 hours) but also improves the initial cold rate, ability to maintain the cold rates longer on overcharge test, and the durability of the battery on overcharge test.

I have found that there is a substantial gain in formation efficiency when the plates are rapidly formed. For example, formation of a battery at the conventional slow rate which unstabilized positive plates require, consumes 385 ampere-hours of current, whereas rapid formation permitted by stabilization consumes 280 ampere-hours of current. Formation efficiency is increased about 27%. I have found that the discharge efficiency of a rapidly formed battery is 10% higher.

In this specification the term "stabilized" as applied to positive active material means free of ingredients highly reactive to forming electrolyte and should not be confused with the term "stable" as sometimes applied to the form of normal lead sulphate which is hard to convert to lead peroxide in the forming electrolyte.

While the embodiments of the present invention as herein disclosed, constitute preferred forms, it is to be understood that other forms might be adopted, all coming within the scope of the claims which follow.

What is claimed is as follows:

1. The method of manufacturing storage batteries including positive plates having stabilized active material including yellow and red lead oxides as its major ingredients, the steps comprising; assembling stabilized positive plates with negative plates to form a cell group, submerging said assembly in sulphuric acid having a gravity of about 1.100, passing a current in the order of .119 to .178 ampere per square inch of positive plate area for about four hours through said cell group, dumping the acid therefrom and replacing said acid with 1.290 to 1.310 gravity acid, again passing a current of from .119 to .178 ampere per square inch of positive plate area through the group for about an hour whereby the battery plates are fully formed.

2. The method of manufacturing storage batteries which include positive plates having stabilized active material comprising yellow and red lead oxides as its major ingredients, the steps comprising; assembling stabilized positive plates with negative plates to form a cell group, forming said group in 1.100 specific gravity acid for a period of about four hours at a current density of from .119 to .178 ampere per square inch of positive plate surface, replacing the acid at the end of said forming period with a 1.380 specific gravity acid and then continuing the formation at the same current density for about one hour.

ROBERT A. DAILY.

REFERENCES CITED

The following references are of record in the file of this patent:

UNITED STATES PATENTS

| Number | Name | Date |
|---|---|---|
| 649,491 | Sperry | May 15, 1900 |
| 1,228,547 | Flanders | June 5, 1917 |
| 1,802,818 | Hutchinson | Apr. 28, 1931 |
| 2,287,868 | Daily | June 30, 1942 |

FOREIGN PATENTS

| Number | Country | Date |
|---|---|---|
| 5,680 | Great Britain | of 1883 |

OTHER REFERENCES

Vinal, G. W. Storage Batteries, 3rd edition (1940), pages 33–35.